(12) United States Patent
Cheng

(10) Patent No.: US 11,395,353 B2
(45) Date of Patent: Jul. 19, 2022

(54) SYSTEM AND METHOD FOR 4G AUTOMATIC LINK ESTABLISHMENT PROTOCOL ENHANCEMENT

(71) Applicant: Rockwell Collins, Inc., Cedar Rapids, IA (US)

(72) Inventor: Ho Ting Cheng, Stittsville (CA)

(73) Assignee: Rockwell Collins, Inc., Cedar Rapids, IA (US)

( * ) Notice: Subject to any disclaimer, the term of this patent is extended or adjusted under 35 U.S.C. 154(b) by 276 days.

(21) Appl. No.: 16/750,776

(22) Filed: Jan. 23, 2020

(65) Prior Publication Data

US 2021/0235514 A1  Jul. 29, 2021

(51) Int. Cl.
*H04W 76/10* (2018.01)
*H04L 45/745* (2022.01)

(52) U.S. Cl.
CPC ........... *H04W 76/10* (2018.02); *H04L 45/745* (2013.01)

(58) Field of Classification Search
CPC .............................. H04W 76/10; H04L 45/745
See application file for complete search history.

(56) References Cited

U.S. PATENT DOCUMENTS

| | | | |
|---|---|---|---|
| 5,930,685 A * | 7/1999 | Straub | H04W 76/10 455/72 |
| 6,530,059 B1 | 3/2003 | Crozier et al. | |
| 6,985,437 B1 * | 1/2006 | Vogel | H04L 1/0003 370/230 |
| 7,007,218 B2 | 2/2006 | Chamberlain | |
| 7,073,114 B2 | 7/2006 | Massey | |
| 7,085,986 B2 | 8/2006 | Nefedov | |

(Continued)

FOREIGN PATENT DOCUMENTS

| | | |
|---|---|---|
| CN | 106027184 A | 10/2016 |
| EP | 1807988 B1 | 9/2015 |

(Continued)

OTHER PUBLICATIONS

"MIL-STD-188-110C. Department of Defense Interface Standard. Interoperability and performances standards for data modems", Sep. 23, 2011 (Sep. 23, 2011), pp. 1-239, XP055082317.

(Continued)

*Primary Examiner* — Christopher M Crutchfield
*Assistant Examiner* — Tito Q Pham
(74) *Attorney, Agent, or Firm* — Suiter Swantz pc llo

(57) ABSTRACT

A method for 4G Automatic Link Establishment protocol enhancement may include, but is not limited to, determining a first signal-to-noise ratio (SNR) value with a called participating unit (called PU) from a first protocol data unit (PDU) including a first number of transmit level control (TLC) blocks transmitted by a calling participating unit (calling PU), determining a second SNR value corresponding to the first SNR value from a lookup table stored on the called PU, determining a third SNR value with the calling PU from a second PDU including a second number of TLC blocks transmitted by the called PU, determining a fourth SNR value corresponding to the third SNR value from a lookup table stored on the calling PU, and determining a fifth SNR value with the called PU from a third PDU including a third number of TLC blocks transmitted by the calling PU.

14 Claims, 7 Drawing Sheets

(56) References Cited

U.S. PATENT DOCUMENTS

| | | | |
|---|---|---|---|
| 7,092,402 B1* | 8/2006 | Smith | H04L 47/10 |
| | | | 370/437 |
| 7,653,858 B2 | 1/2010 | Nefedov | |
| 7,958,425 B2 | 6/2011 | Chugg et al. | |
| 8,683,292 B2 | 3/2014 | Lee et al. | |
| 8,824,289 B2 | 9/2014 | Gormley et al. | |
| 9,282,500 B1* | 3/2016 | Thommana | H04W 40/12 |
| 9,408,181 B2 | 8/2016 | Bhanage et al. | |
| 10,284,255 B1* | 5/2019 | Hwang | H04L 27/2647 |
| 2006/0129902 A1 | 6/2006 | Lee et al. | |
| 2007/0076810 A1* | 4/2007 | Herrera | H04L 1/20 |
| | | | 375/261 |
| 2008/0317107 A1* | 12/2008 | Zhou | H04L 5/1438 |
| | | | 375/222 |
| 2012/0040618 A1* | 2/2012 | Furman | H04W 28/18 |
| | | | 455/62 |
| 2013/0252558 A1* | 9/2013 | Nieto | H04W 72/08 |
| | | | 455/73 |
| 2016/0127056 A1* | 5/2016 | Soman | H04B 3/54 |
| | | | 370/463 |
| 2017/0029107 A1* | 2/2017 | Emami | G01S 13/003 |
| 2019/0181985 A1 | 6/2019 | Fay et al. | |
| 2020/0106585 A1* | 4/2020 | Bayer | H04L 5/0048 |

FOREIGN PATENT DOCUMENTS

| | | |
|---|---|---|
| GB | 2440584 A | 2/2008 |
| GB | 2444099 B | 4/2009 |
| IN | 2297CHE2008 A | 9/2008 |

OTHER PUBLICATIONS

Department of Defense: "MIL-STD-188-141D Appendix G Wideband Automatic Link Establishment System (WALE)", Dec. 22, 2017 (Dec. 22, 2017), pp. 1-370, XP055808093.

Extended Search Report for European Application No. 21153282.5 dated Jun. 8, 2021, 9 pages.

* cited by examiner

| 302 | 304 |
|---|---|
| # of TLC blocks (time) | SNR [dB] |
| 0 (0ms) | 40 |
| 3 (40ms) | 42 |
| 10 (133.33ms) | 47 |
| 20 (266.66ms) | 50 |
| 100 (1333.33ms) | 51 |

FIG. 3

SYSTEM AND METHOD FOR 4G AUTOMATIC LINK ESTABLISHMENT PROTOCOL ENHANCEMENT

BACKGROUND

Automatic Link Establishment (ALE) is one option available for establishing data communication between high frequency (HF) radios. A link quality for data communication between HF radios may be determined, at least in part, on a call linking time and a selected data rate. The call linking time may be determined by a length of an air frame during a three-way ALE handshake. The selected data rate may be determined by a signal-to-noise ratio (SNR) received during the ALE handshake.

SUMMARY

A method for 4G Automatic Link Establishment protocol enhancement is disclosed, in accordance with one or more embodiments of the disclosure. The method may include, but is not limited to, receiving a first protocol data unit (PDU) including a first number of transmit level control (TLC) blocks for an Automatic Link Establishment (ALE) handshake from a calling participating unit (calling PU). The first PDU may lead to a first signal-to-noise ratio (SNR) value being determined by a called participating unit (called PU). The method may include, but is not limited to, determining a second SNR value corresponding to the first SNR value of the first PDU from a stored lookup table of the called PU. The method may include, but is not limited to, transmitting a second PDU including the second number of TLC blocks for the ALE handshake to the calling PU following the receipt of the first PDU. The second PDU may lead to a third SNR value being determined by the calling PU. The method may include, but is not limited to, receiving a third PDU including a third number of TLC blocks for the ALE handshake from the calling PU following the transmission of the second PDU. The third PDU may include a fourth SNR value. The third PDU may lead to a fifth SNR value being determined by the called PU.

In some embodiments, a call linking time with the calling PU may be dependent on at least one of the first number of TLC blocks in the first PDU, the second number of TLC blocks in the second PDU, or the third number of TLC blocks in the third PDU.

In some embodiments, the call linking time may be reduced with at least one of a low number of TLC blocks for the first number of TLC blocks in the first PDU, a low number of TLC blocks for the second number of TLC blocks in the second PDU, or a low number of TLC blocks for the third number of TLC blocks in the third PDU.

In some embodiments, a data transfer rate with the calling PU may be dependent on at least one of the second SNR value in an SNR field of the second PDU or the fourth SNR value in an SNR field of the third PDU.

In some embodiments, the call linking time may be reduced with a low number of TLC blocks for the second number of TLC blocks in the second PDU.

In some embodiments, the call linking time may be reduced with a low number of TLC blocks for the third number of TLC blocks in the third PDU.

In some embodiments, the method may include, but is not limited to, acquiring the lookup table.

In some embodiments, the lookup table may be prepopulated.

In some embodiments, the lookup table may be prepopulated with simulated data.

In some embodiments, the lookup table may be generated from over-the-air measurements.

In some embodiments, the method may include, but is not limited to, applying a scaling factor when determining the second SNR value corresponding to the first SNR value of the first PDU.

In some embodiments, the method may include, but is not limited to, transmitting the first PDU including the first number of TLC blocks for the ALE handshake to a called participating unit (PU). The first PDU may lead to the first signal-to-noise ratio (SNR) value being determined by the called PU. The method may include, but is not limited to, receiving the second PDU including the second number of TLC blocks for the ALE handshake from the called PU following the transmission of the first PDU. The second PDU may include the second SNR value. The second PDU may lead to the third SNR value being determined by the calling PU. The method may include, but is not limited to, determining the fourth SNR value corresponding to the third SNR value of the second PDU from a stored lookup table of the calling PU. The method may include, but is not limited to, transmitting the third PDU including the third number of TLC blocks for the ALE handshake to the called PU following the receipt of the second PDU. The third PDU may include the fourth SNR value. The third PDU may lead to the fifth SNR value being determined by the called PU.

In some embodiments, the method may include, but is not limited to, applying a scaling factor when determining the fourth SNR value corresponding to the third SNR value of the second PDU from the stored lookup table of the calling PU.

A method for 4G Automatic Link Establishment protocol enhancement is disclosed, in accordance with one or more embodiments of the disclosure. The method may include, but is not limited to, transmitting a first protocol data unit (PDU) including a first number of transmit level control (TLC) blocks for an Automatic Link Establishment (ALE) handshake to a called participating unit (PU). The first PDU may lead to a first signal-to-noise ratio (SNR) value being determined by the called PU. The method may include, but is not limited to, receiving a second PDU including a second number of TLC blocks for the ALE handshake from the called PU following the transmission of the first PDU. The second PDU may include the second SNR value. The second PDU may lead to a third SNR value being determined by a calling PU. The method may include, but is not limited to, determining a fourth SNR value corresponding to the third SNR value of the second PDU from a stored lookup table of the calling PU. The method may include, but is not limited to, transmitting a third PDU including the third number of TLC blocks for the ALE handshake to the called PU following the receipt of the second PDU. The third PDU may include the fourth SNR value. The third PDU may lead to a fifth SNR value being determined by the called PU.

In some embodiments, the method may include, but is not limited to, receiving the first PDU including the first number of TLC blocks for the ALE handshake from a calling PU. The first SNR value may be determined by the called PU. The method may include, but is not limited to, determining the second SNR value corresponding to the first SNR value of the first PDU from a stored lookup table of the called PU. The method may include, but is not limited to, transmitting the second PDU including the second number of TLC blocks for the ALE handshake to the calling PU following the receipt of the first PDU. The second PDU may lead to the third SNR value being determined by the calling PU. The method may include, but is not limited to, receiving the third PDU including the third number of TLC blocks for the ALE handshake from the calling PU following the transmission of the second PDU. The third PDU may include the fourth SNR value. The third PDU may lead to the fifth SNR value being determined by the called PU.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 3 is a table illustrating a comparison between transmit level control (TLC) blocks and signal-to-noise ratio (SNR) for a 4G ALE handshake, in accordance with one or more embodiments of the disclosure;

DETAILED DESCRIPTION OF THE INVENTION

Figure 1:
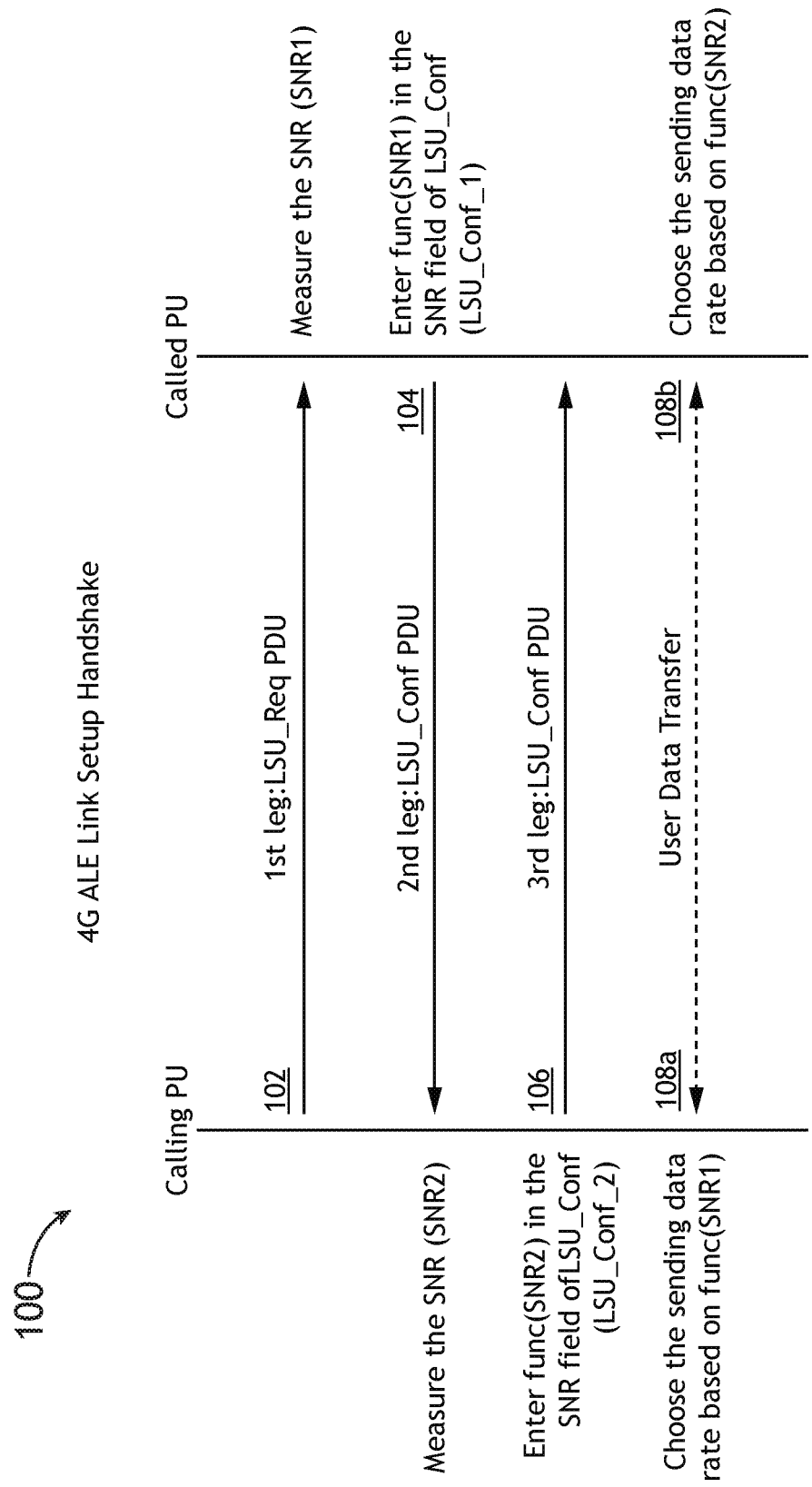
FIG. 1 is a block diagram illustrating a method for a 4G Automatic Link Establishment (ALE) link setup handshake, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1-7 generally illustrate a system and method for 4G Automatic Link Establishment protocol enhancement, in accordance with one or more embodiments of the disclosure.

Automatic Link Establishment (ALE) is one option available for establishing 4G data communication between high frequency (HF) radios. FIG. 1 illustrates a typical three-way (or three-leg) ALE handshake 100, in accordance with one or more embodiments of the disclosure.

In a step 102 (or first (1st) leg), a Calling Participating Unit (Calling PU) may determine whether an ALE channel to a Called Participating Unit (Called PU) is available to receive data. If it determines the ALE channel is unoccupied, the Calling PU may send a Link Setup Request (LSU_Req) protocol data unit (PDU) (e.g., LSU_Req PDU) to a Called PU. For example, the LSU_Req PDU may define the Calling PU and the Called PU, an available spectrum for the channel and sub-channels, the Equipment Capability (EC) of the Calling PU, and/or the type of data to be transferred.

The Called PU may evaluate the assigned frequency band of the transmission channel (e.g., by measuring the signal-to-noise ratio (SNR) of the assigned frequency band) with the receipt of the LSU_Req PDU (e.g., SNR1). The SNR1 measured in the LSU_Req PDU may be entered as func (SNR1) in an SNR field of a Link Setup Confirm (LSU_Conf) protocol data unit (PDU) (e.g., LSU_Conf_1 PDU).

In a step 104 (or second (2nd) leg), the Called PU may determine whether an ALE channel to the Calling PU is available to receive data. If it determines the ALE channel is unoccupied, the Called PU may send the LSU_Conf PDU (e.g., LSU_Conf_1 PDU). For example, the LSU_Conf PDU may include the Equipment Capability (EC) of the Called PU, transmission and receiving sub-channel vectors, and the SNR1 measured in the LSU_Req PDU.

The Calling PU may evaluate the assigned frequency band of the transmission channel (e.g., by measuring the signal-to-noise ratio (SNR) of the assigned frequency band) with the receipt of the LSU_Conf_1 PDU (e.g., SNR2). The SNR2 measured in the LSU_Conf_1 PDU may be entered as func(SNR2) in an SNR field of a second LSU_Conf PDU (e.g., LSU_Conf_2 PDU).

In a step 106 (or third (3rd) leg), the Calling PU may send the second LSU_Conf PDU (e.g., the LSU_Conf_2 PDU). For example, the LSU_Conf_2 PDU may include the Equipment Capability (EC) of the Called PU, transmission and receiving sub-channel vectors, and the SNR2 measured in the LSU_Conf_1 PDU.

In a step 108a, user data may be transferred from the Calling PU to the Called PU with a sending data rate based on func(SNR1). In a step 108b, user data may be transferred from the Called PU to the Calling PU with a sending data rate based on func(SNR2).

Where either PU does not receive a timely response to a transmitted PDU, the PU not receiving the timely response may transmit an LSU_Termination (LSU_Term) PDU to terminate the link. Where either PU determines there are not enough sub-channels, the PU determining there are not enough sub-channels may transmit one or more LSU_Term PDUs to terminate the link.

A link quality for data communication between HF radios may be determined, at least in part, on a call linking time and a selected data rate. In 4G ALE, balancing the call linking time and the selected data rate may include reducing the call linking time and selecting the highest data rate that may be supported by a HF link for data transfer after a call is linked.

Figure 2:
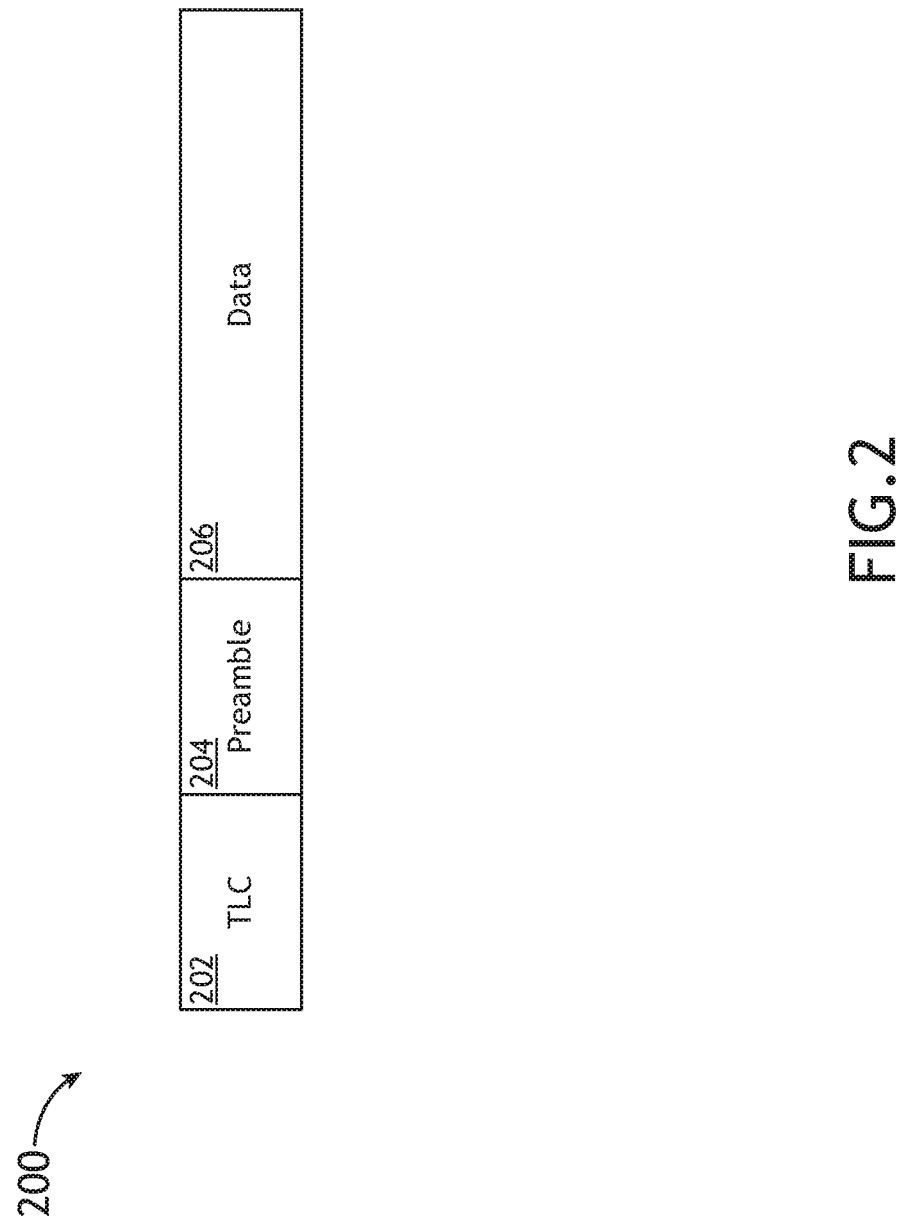
FIG. 2 illustrates a 4G ALE air frame, in accordance with one or more embodiments of the disclosure.

The call linking time may be determined by a length of an air frame during the three-way ALE handshake 100. FIG. 2 illustrates an example air frame 200, in accordance with one or more embodiments of the disclosure. The air frame 200 may be defined by two or three blocks, the blocks including an optional, variable Transmit Level Control (TLC) portion 202 including one or more blocks (or zero blocks, where the air frame 200 does not include the TLC portion), a fixed Preamble portion 204, and a fixed Data portion 206. A shorter TLC portion 202 including a fewer number of blocks may result in a faster call linking time, while a longer TLC block 202 including a greater number of blocks may result in a better representation of call link quality and an increased call linking delay.

The selected data rate may be determined by a signal-to-noise ratio (SNR) received during the ALE handshake. In one example, a 10 decibel (dB) SNR may be considered a poor value for supporting data rate during data transfer, a 30 dB SNR may be considered an acceptable value for supporting data rate during data transfer, and a 50 dB SNR may be considered a great value for supporting data rate during data transfer.

FIG. 3 illustrates a table 300 illustrating a comparison between a number of TLC blocks 302 (with corresponding call linking delay in milliseconds (ms)) and a resultant SNR value 304 (in dB) over an Additive White Gaussian Noise (AWGN) channel, in accordance with one or more embodiments of the disclosure. As illustrated in the table 300, an increased number of TLC blocks 302 may generally result in an increased SNR value 304. In this regard, increasing the number of TLC blocks 302 may increase the data transfer rate, while also increasing the call linking delay.

To evaluate the call link quality, a select number of TLC blocks 302 are used in transmission for stabilizing Automatic Level Control (ALC) loops and Automatic Gain Control (AGC) loops, at the expense of call linking delay. In practice, a small number of TLC blocks (e.g., three blocks) may be necessary to stabilize the ALC and AGC loops, allowing for a reduced ALE call linking time. However, a large number of TLC blocks 302 may be necessary to determine an SNR performance, which may result in an increased ALE call linking time.

As such, it would be beneficial to provide a system and method that uses a small number of TLC blocks 302 to quickly establish a call link, while also using a large number of TLC blocks 302 to determine an SNR performance that characterizes the quality of the call link.

It is noted herein that ALE is a military standard described in MIL-STD-188-141D, titled *Interoperability and Performance Standards for Medium and High Frequency Radio Systems*, issued on Dec. 22, 2017. Therefore, aspects of this invention may be configured to and/or required to conform with the guidelines set forth by MIL-STD-188-141D.

Figure 4:
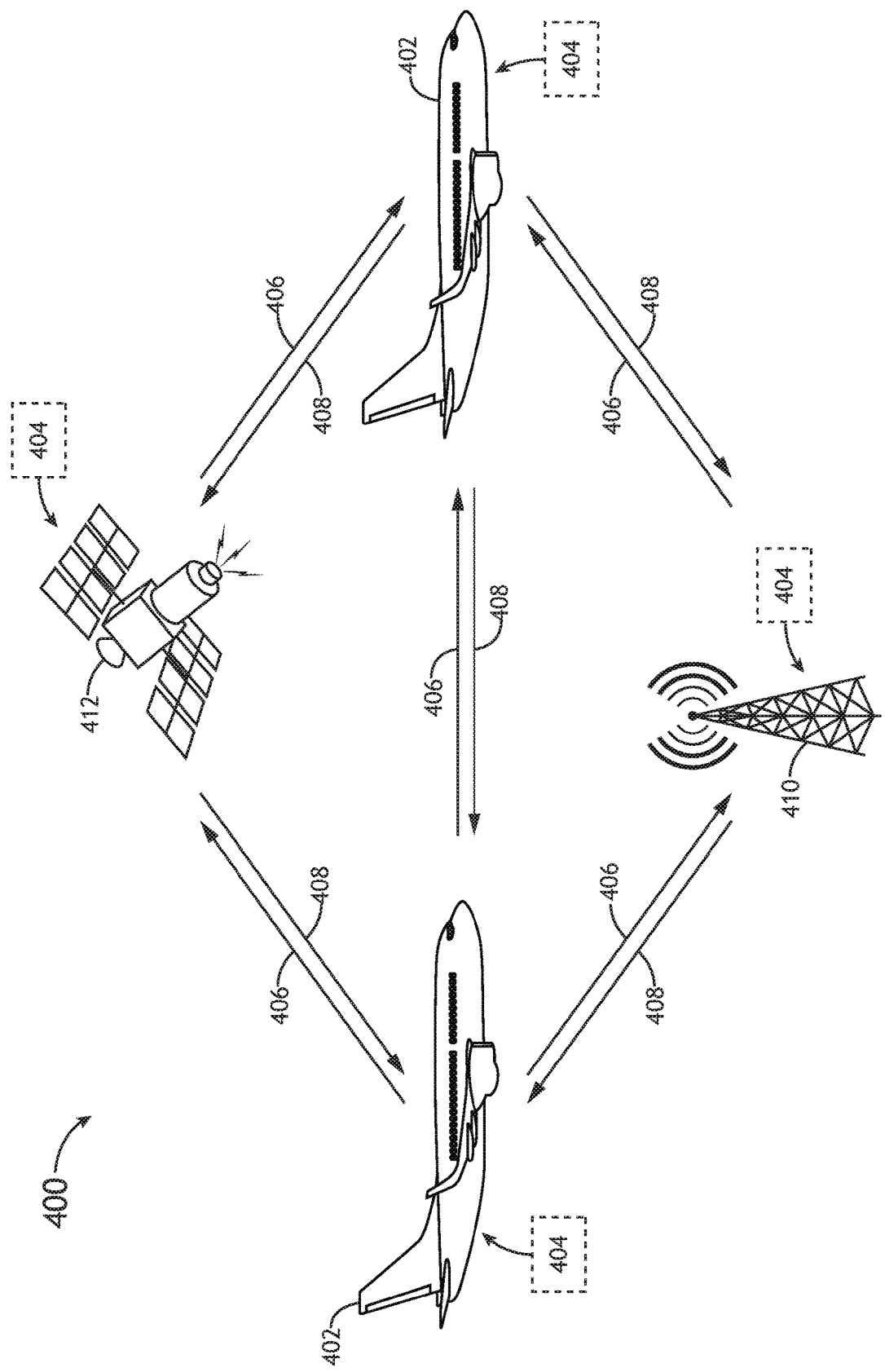
FIG. 4 illustrates an environment in which a system and method for 4G ALE protocol enhancement may be used, in accordance with one or more embodiments of the disclosure.

FIG. 4 illustrates an environment 400, in accordance with one or more embodiments of the disclosure.

The environment 400 may include one or more aircraft 402, where each of the one or more aircraft 402 may include a radio 404. For example, where there are two aircraft 402, a first aircraft 402 may transmit data 406 to a second aircraft 402, and the second aircraft 402 may transmit data 408 to the first aircraft 402. The data transmission may follow a three-way handshake (e.g., as described with respect to FIG. 1).

Although embodiments of the present disclosure illustrate communication occurring between two aircraft 402, it is noted herein the communication may occur between any number of aircraft 402, either in parallel or in series (e.g., chained communication). Therefore, the above description should not be interpreted as a limitation on the present disclosure but merely an illustration.

Where the environment includes an avionics environment, it is noted herein the system and method for 4G Automatic Link Establishment protocol enhancement may be configured in accordance with aviation guidelines and/or standards put forth by, but not limited to, the Department of Defense (DoD), the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Although embodiments of the disclosure are directed to an avionics environment, it is noted herein the system and method for 4G Automatic Link Establishment protocol enhancement may be configured to operate in any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. Therefore, the above description should not be interpreted as a limitation on the present disclosure but merely an illustration.

Although embodiments of the present disclosure are directed to a system and method for 4G Automatic Link Establishment protocol enhancement being used with radios 404 installed within aircraft 402, it is noted herein the system and method for 4G Automatic Link Establishment protocol enhancement may be coupled to and/or configured to operate with any type of radio.

For example, the system and method for 4G Automatic Link Establishment protocol enhancement may be implemented by one or more unmanned aerial vehicle (UAV) control stations. The UAV control station may be a stand-alone portable device. It is noted herein, however, that the UAV control station may be housed within and/or coupled to a facility or a moving vehicle (e.g., van, truck, boat, spacecraft, other aircraft, or the like). In addition, it is noted herein the UAV control station may be subject to the avionics guidelines and/or standards as set forth above. Therefore, the above description should not be interpreted as a limitation on the present disclosure but merely an illustration.

By way of another example, it is noted herein that communication may occur between the aircraft 402 and a base station 410 (e.g., which may include a radio 404), with transmission of data 406, 408 between the aircraft 402 and the base station 410. By way of another example, it is noted herein that communication may occur between the aircraft 402 and a satellite 412 (e.g., which may include a radio 404), with transmission of data 406, 408 between the aircraft 402 and the satellite 412.

By way of another example, the system and method for 4G Automatic Link Establishment protocol enhancement may be coupled to and/or configured to operate in a commercial or industrial environment (e.g., in either a home or a business). Therefore, the above description should not be interpreted as a limitation on the present disclosure but merely an illustration.

It is noted herein that transmission and receipt of data within the environment 400 is not limited to the directions of the data 406, 408 as illustrated in FIG. 4. In general, the data 406, 408 may be transmitted to and/or received by any device or structure within the environment 400. Therefore, the above description should not be interpreted as a limitation on the present disclosure but merely an illustration.

Figure 5:
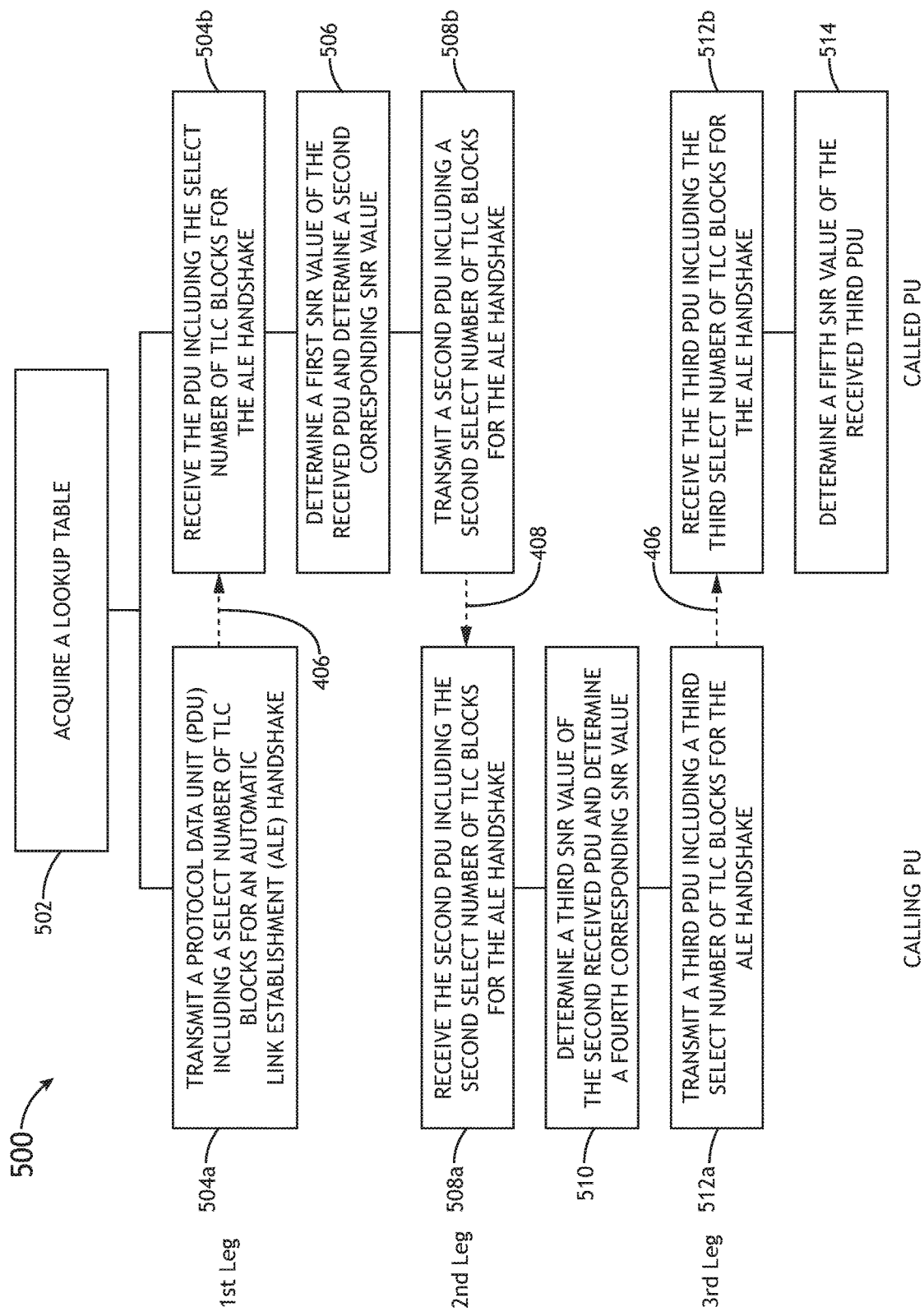
FIG. 5 is a flow diagram illustrating a method for 4G ALE protocol enhancement, in accordance with one or more embodiments of the disclosure.
Figure 6:
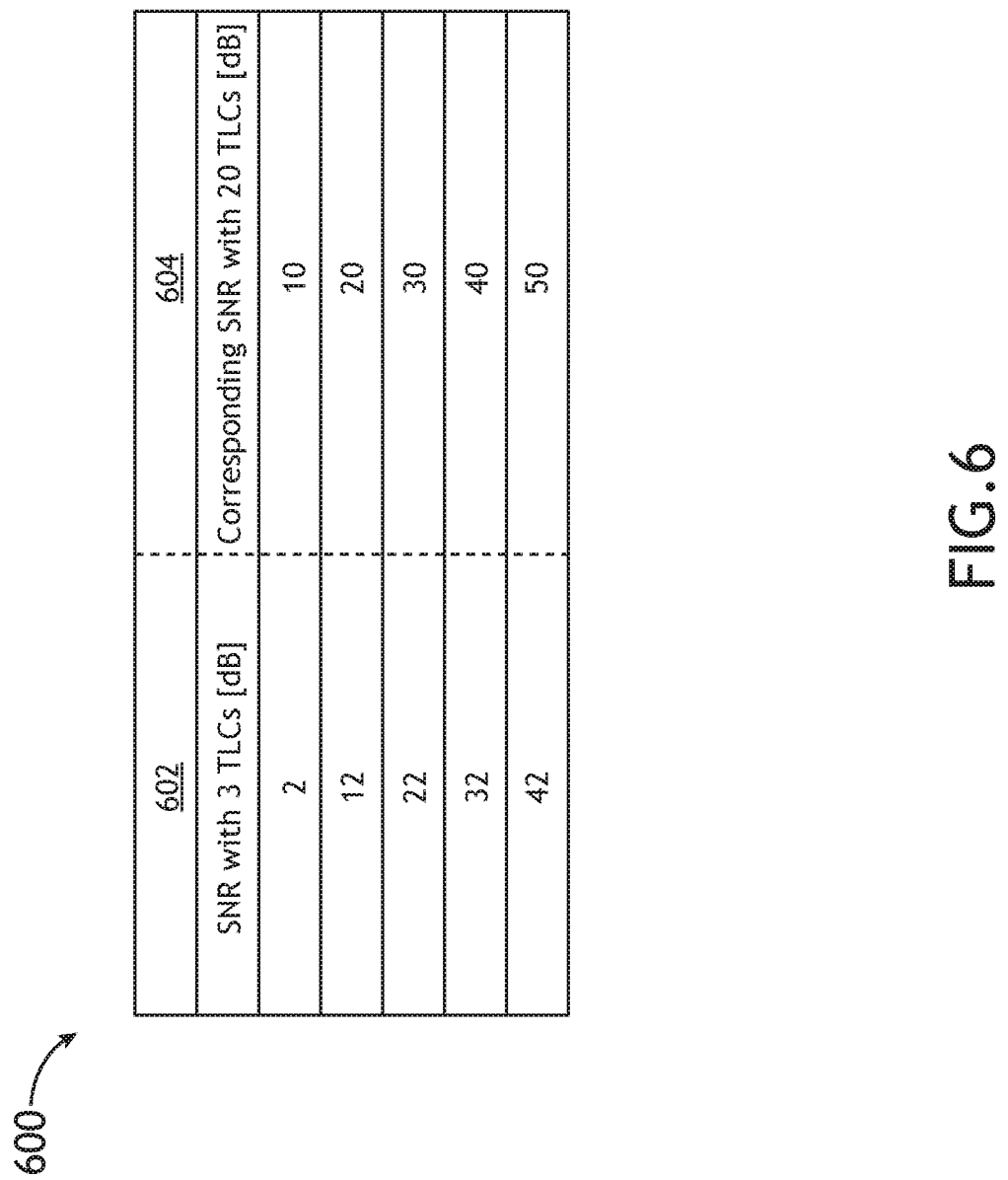
FIG. 6 is a table illustrating a comparison between an SNR for a first set of TLC blocks and an SNR for a second set of TLC blocks, in accordance with one or more embodiments of the disclosure.

FIG. 5 illustrates a method or process 500 for 4G Automatic Link Establishment protocol enhancement, in accordance with one or more embodiments of the disclosure. FIG. 6 illustrates a lookup table 600, in accordance with one or more embodiments of the present disclosure.

In a step 502, a lookup table is acquired. The lookup table may include data for transmit level control (TLC) block number and corresponding signal-to-noise ratio (SNR). The lookup table may be prepopulated for one or more link profiles (e.g., through one or more offline simulations/simulated data, through historical data, or the like) offboard the aircraft 402 and stored within the radio 404 (e.g., within the Calling Participating Unit (Calling PU) and/or within the Called Participating Unit (Called PU)). The lookup table may be generated via one or more over-the-air measurements and stored within the radio 404 (e.g., within a radio 404 of the Calling PU (e.g., including, but not limited to, a first aircraft 402) and/or within a radio 404 of the Called PU (e.g., including, but not limited to, a second aircraft 402)).

In a link profile column 602, a list of SNR values for a select number of TLC blocks is provided. For example, a link profile may be defined by a particular number of TLC blocks, a station, a frequency, a time of day, or other values/variables/metrics. For instance, the lookup table 600 may include multiple link profile columns representing typical high frequency (HF) link profiles including, but not limited to, Comité Consultatif International des Radiocommunications (CCIR) Poor, CCIR Good, or the like. The link profile column 602 may include SNR values defined for a small number of TLC blocks (e.g., 3 TLC blocks), the small number of blocks selected so as to increase the speed of ALE call linking in the ALE handshake.

In a mapped column 604, a list of SNR values for a particular number of TLC blocks (e.g., 20 TLC blocks) is provided. The mapped column 604 may include SNR values defined for a large number of TLC blocks (e.g., 20 TLC blocks) so as to determine a high data rate call link quality. It is noted herein the mapped column 604 may include SNR values defined for a greater number of TLC blocks than the number of TLC blocks represented in the link profile column 602.

The alignment of the link profile column 602 and the mapped column 604 may allow for the corresponding of values within the link profile column 602 and values within the mapped column 604 (e.g., 2 with 10, 12 with 20, and the like, as illustrated in FIG. 6).

It is noted herein the lookup table 600 may include multiple corresponding link profile columns 602 that may correspond to the mapped column 604. In addition, it is noted herein the lookup table 600 may include multiple mapped columns 604. Further, it is noted herein the lookup table 600 may be one of multiple lookup tables 600. Therefore, the above description should not be interpreted as a limitation on the present disclosure but merely an illustration.

It is noted herein one or more of the link profile column 602, the mapped column 604, and/or the lookup table 600 may be determined by a modem dynamically. For example, which link profile column 602, mapped column 604, and/or lookup table 600 may be determined by a user through a selection of an operation parameter. By way of another example, the link profile column 602, the mapped column 604, and/or the lookup table 600 may be updated with new offline simulations/simulated data and/or with on-the-fly measurement calculations. Therefore, the above description should not be interpreted as a limitation on the present disclosure but merely an illustration.

In a step 504a, a protocol data unit (PDU) including a select number of TLC blocks for an Automatic Link Establishment (ALE) handshake is transmitted. In a step 504b, a protocol data unit (PDU) including a select number of TLC blocks for an Automatic Link Establishment (ALE) handshake is received. The PDU may include a Link Setup Request (LSU_Req) PDU. The select number of TLC blocks may correspond to a particular link profile column 602 of the lookup table 600.

In a step 506, a first SNR value of the received PDU is determined, and a second SNR value corresponding to the first SNR value is determined. The first PDU may lead to the first SNR value. For example, the first SNR value may be decoded from the LSU_Req PDU. The second SNR value corresponding to the first SNR value of the first PDU (i.e., the LSU_Req PDU) may be located within the mapped column 604 of the lookup table 600. For example, the second SNR value may be interpolated or extrapolated before being located within the mapped column 604.

For example, a received 3 TLC-block signal with a 12 dB SNR may correspond to a 20 TLC-block signal with a 20 dB SNR, per the lookup table 600. Based on this, a 3 TLC-block signal may be transmitted to the Called PU where a 12 dB SNR is measured for the first SNR value (e.g., the radio 404 of the second aircraft 402) to reduce the call linking time, and a 20 dB SNR value (that is equivalent to a 20-TLC block signal) may be entered into an SNR field of the second PDU as the second SNR value sent back to the Calling PU (e.g., the radio 404 of the first aircraft 402) to increase the data link quality of the linked call.

It is noted herein that the steps 504a, 504b may be considered a first (1st) leg of the process 500. In addition, it is noted herein that the steps 504a, 504b, 506 may be considered the first leg of the process 500. Therefore, the above description should not be interpreted as a limitation on the scope of the disclosure but merely an illustration.

In a step 508a, a protocol data unit (PDU) including a select number of TLC blocks for an Automatic Link Establishment (ALE) handshake is transmitted. In a step 508b, a protocol data unit (PDU) including a select number of TLC blocks for an Automatic Link Establishment (ALE) handshake is received. The PDU may include a Link Setup Confirm (LSU_Conf) PDU (e.g., LSU_Conf_1 PDU). The second SNR value may be stored in an SNR field of the LSU_Conf_1 PDU. The select number of TLC blocks may correspond to the link profile column 602 of the lookup table 600.

In a step 510, a third SNR value of the received second PDU is determined, and a fourth SNR value corresponding to the third SNR value is determined. The second PDU may lead to the third SNR value. For example, the third SNR value may be decoded from the LSU_Conf_1 PDU. The fourth SNR value corresponding to the third SNR value of the received second PDU may be located within the mapped column 604 of the lookup table 600. For example, the fourth SNR value may be interpolated or extrapolated before being located within the mapped column 604.

It is noted herein that the steps 508a, 508b may be considered a second (2nd) leg of the process 500. In addition, it is noted herein that the steps 508a, 508b, 510 may be considered the second leg of the process 500. Therefore, the above description should not be interpreted as a limitation on the scope of the disclosure but merely an illustration.

In a step 512a, a protocol data unit (PDU) including a select number of TLC blocks for an Automatic Link Establishment (ALE) handshake is transmitted. In a step 512b, a protocol data unit (PDU) including a select number of TLC blocks for an Automatic Link Establishment (ALE) handshake is received. The PDU may include a Link Setup Confirm (LSU_Conf) PDU (e.g., an LSU_Conf_2 PDU). The fourth SNR value may be stored in an SNR field of the LSU_Conf_2 PDU. The select number of TLC blocks may correspond to the mapped column 604 of the lookup table 600.

In a step 514, a fifth SNR value of the received third PDU is determined. The third PDU may lead to the fifth SNR value. For example, the fifth SNR value may be decoded from the LSU_Conf_2 PDU.

It is noted herein that the steps 512a, 512b may be considered a third (3rd) leg of the process 500. In addition, it is noted herein that the steps 512a, 512b, 514 may be considered the third leg of the process 500. Therefore, the above description should not be interpreted as a limitation on the scope of the disclosure but merely an illustration.

Between the LSU_Conf_1 PDU and the LSU_Conf_2 PDU, the Calling PU radio 404 and the Called PU radio 404 may successfully negotiate a call data rate. The first SNR value may be measured by decoding the first PDU at the Called PU, and the second SNR value may be obtained based on the decoded first SNR value via the lookup table 600 at the Called PU. The third SNR value may be measured by decoding the second PDU at the Calling PDU, and the fourth SNR value may be obtained based on the decoded third SNR value via the lookup table 600 at the Calling PU. The fifth SNR value may be measured by decoding the third PDU at the Called PU.

In this regard, the process to negotiate the call data rate may be considerably shortened with the use of the lookup table 600 and the reduced call linking time caused by the use of a smaller number of TLC blocks used within the LSU_Req PDU prior to the determination of the SNR value included in the LSU_Conf_1 PDU.

In addition, it noted herein the select number of TLC blocks used in the first leg, the second leg, and the third leg of the process 500 may be the same. For example, 3 TLC blocks may be used in the first leg, the second leg, and the third leg. In general, the process 500 may use the same low number of TLC blocks in the first leg, the second leg, and the third leg. However, the process 500 may use a different select number of TLC blocks in the first leg, the second leg, and/or the third leg. Therefore, the above description should not be interpreted as a limitation on the scope of the disclosure but merely an illustration.

The process 500 is not limited to the steps and/or sub-steps provided. The process 500 may include more or fewer steps and/or sub-steps. The process 500 may perform the steps and/or sub-steps simultaneously. The process 500 may perform the steps and/or sub-steps sequentially, including in the order provided or an order other than provided. Therefore, the above description should not be interpreted as a limitation on the scope of the disclosure but merely an illustration.

It is noted herein the process 500 may be at least partially enabled or disabled. For example, a scaling factor may be applied when determining the second SNR value corresponding to the first SNR value of the first PDU (e.g., from the stored lookup table 600 of the called PU). By way of another example, a scaling factor may be applied when determining the fourth SNR value corresponding to the third SNR value of the second PDU (e.g., from the stored lookup table 600 of the calling PU). A scaling factor may be applied with a value between 0 and 1, where 0 means "disabled" and 1 means "enabled." A value between 0 and 1 may partially activate the process 500 when determining a corresponding SNR value from the stored lookup table. For example, a 2 dB SNR may scale to 10 dB SNR at 100%, or scaling factor equals "1", while a 2 dB SNR may scale to 6 dB SNR at 50%.

In addition, it is noted herein the duration of an actual over-the air data transmission may be shortened without incurring any additional delay in ALE call linking time once a call is linked. In addition, it is noted herein that the determined call rate may be fixed for data transfer of a small amount of data where the transmission is within a coherence time period, but that renegotiating the data rate may be necessary for larger amounts of data. In this regard, the same process 500 using the lookup table 600 may employ the data rate renegotiation delay and determine the highest possible data rate.

Further, it is noted herein that a SNR value received from a control radio 404 may be transmitted back to the control radio within the third PDU or LSU_Conf_2 value, the control radio 404 being co-located with a radio 404 under test that is using the process 500. If the control radio 404 does not return the same SNR value within its own third PDU or LSU_Conf_2 value, then the control radio 404 is performing the process 500, similar to the radio 404 under test.

Further, it is noted herein that the three-way ALE handshake in FIG. 1 may be accomplished by setting the second SNR value equal to the first SNR value, and setting the fourth SNR value equal to the third SNR value, during the process 500.

Further, it is noted herein that the ALC loops and AGC loops may be set manually rather than automatically by predicting a received signal strength indicator (RSSI) value, though the process of doing so may be tedious and/or difficult as compared to the generation and use of the lookup table.

In this regard, call linking time and traffic throughout for an ALE linked call may be optimized. The optimization of data rate may allow for determining a data rate that both radios 404 may work with, based on issues in the surrounding environment including, but not limited to, SNR. The optimization of time may allow for faster data transfer and/or a greater amount of data transfer before signal fading requiring data rate renegotiation may occur.

Figure 7:
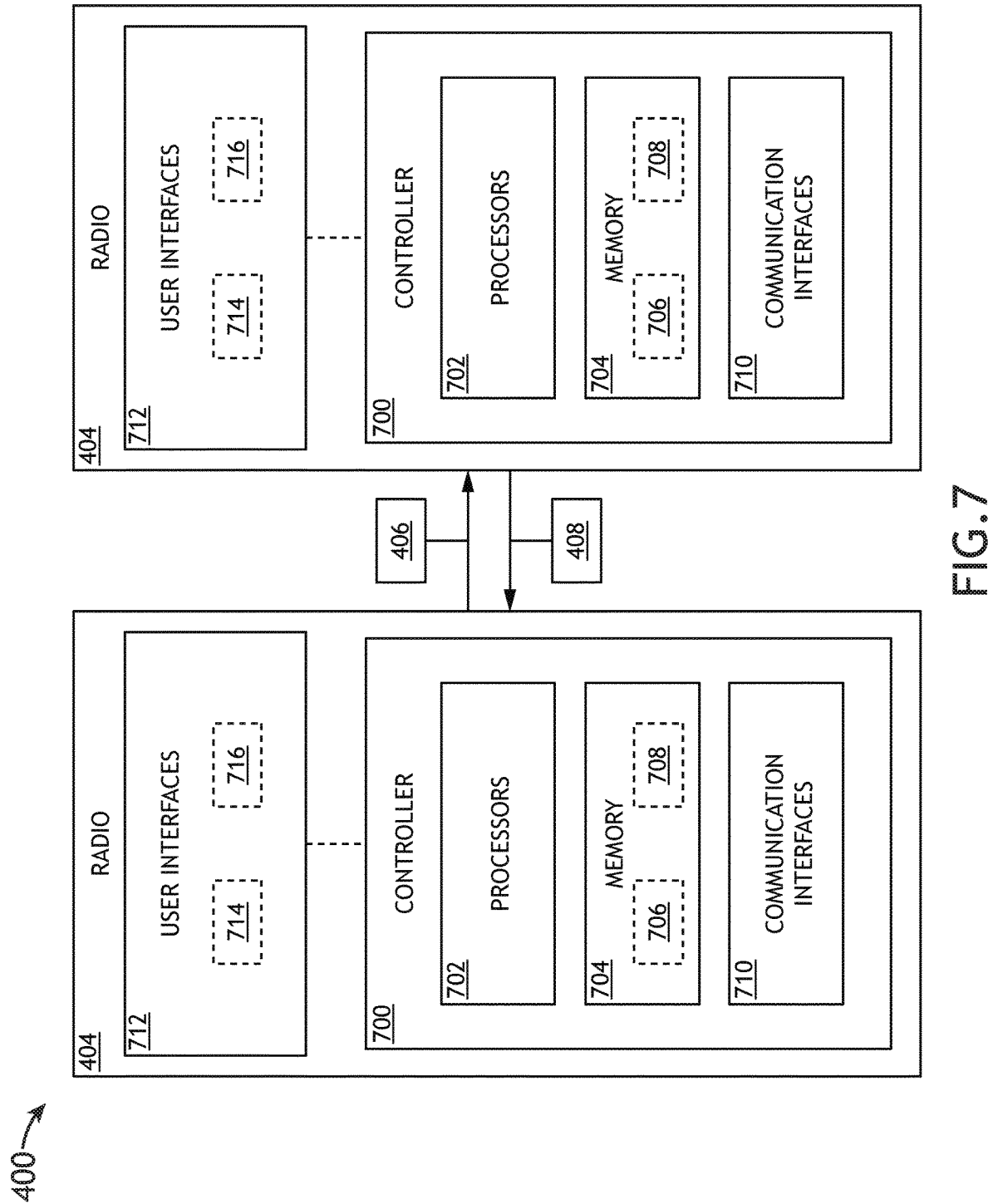
FIG. 7 illustrates a block diagram of an environment in which a system and method for 4G ALE protocol enhancement may be used, in accordance with one or more embodiments of the disclosure.

FIG. 7 illustrates a block diagram of at least a portion of the environment 400, in accordance with one or more embodiments of the disclosure.

The environment 400 may include the one or more radios 404. The one or more radios 404 may transmit data 406, 408.

The one or more radios 404 may include one or more controllers 700. The one or more controllers 700 may include one or more processors 702 and memory 704.

The memory 704 may store one or more sets of program instructions 706. The one or more processors 702 may be configured to execute the one or more sets of program instructions 706 to carry out one or more of the various steps described throughout the present disclosure.

The memory 704 may include one or more tools 708 for analyzing one or more sets of data processing. For example, the one or more sets of data processing may include the lookup table 600. For instance, the one or more sets of data processing may include a prepopulated lookup table 600. In addition, the one or more sets of data processing may include a lookup table 600 generated via one or more over-the-air measurements.

The one or more controllers 700 may include one or more communication interfaces 710. The one or more controllers 700 may include one or more user interfaces 712. The one or more user interfaces 712 may include one or more display devices 714. The one or more user interfaces 712 may include one or more user input devices 716.

Although embodiments of the present disclosure illustrate the one or more controllers 700 and the one or more user interfaces 712 being separate, it is noted herein the one or more controllers 700 and the one or more user interfaces 712 may be housed in a common housing. Therefore, the above description should not be interpreted as a limitation on the present disclosure but merely an illustration.

The one or more processors 702 may include any one or more processing elements known in the art. In this sense, the one or more processors 702 may include any microprocessor device configured to execute algorithms and/or program instructions. In general, the term "processor" may be broadly defined to encompass any device having one or more processing elements, which execute a set of program instructions from a non-transitory memory medium (e.g., the memory 704), where the one or more sets of program instructions 706 are configured to cause the one or more processors 702 to carry out any of one or more process steps.

The memory 704 may include any storage medium known in the art suitable for storing the one or more sets of program instructions 706 executable by the associated one or more processors 702. For example, the memory 704 may include a non-transitory memory medium. For instance, the memory 704 may include, but is not limited to, a read-only memory (ROM), a random access memory (RAM), a magnetic or optical memory device (e.g., disk), a magnetic tape, a solid state drive, and the like. The memory 704 may be configured to provide display information to the one or more display devices 714. In addition, the memory 704 may be configured to store user input information from the one or more user input devices 716. The memory 704 may be housed in a common controller housing with the one or more processors 702. The memory 704 may, alternatively or in addition, be located remotely with respect to the spatial location of the processors 702, the one or more controllers 700 and/or the one or more controllers 700. For instance, the one or more processors 702, the one or more controllers 700, and/or the one or more controllers 700 may access a remote memory 704 (e.g., server), accessible through a network (e.g., internet, intranet, and the like) via one or more communication interfaces.

The one or more communication interfaces 710 may be operatively configured to communicate with one or more components of the one or more controllers 700 and/or the one or more components of the one or more controllers 700. For example, the one or more communication interfaces 710 may also be coupled (e.g., physically, electrically, and/or communicatively) with the one or more processors 702 to facilitate data transfer between components of the one or more components of the one or more controllers 700 and/or the one or more components of the one or more controllers 700 and the one or more processors 702. For instance, the one or more communication interfaces 710 may be configured to retrieve data from the one or more processors 702, or other devices, transmit data for storage in the memory 704, retrieve data from storage in the memory 704, or the like. By way of another example, the one or more controllers 700 and/or one or more offboard controllers may be configured to receive and/or acquire data or information from other systems or tools by a transmission medium that may include wireline and/or wireless portions. By way of another example, the one or more controllers 700 and/or the one or more offboard controllers may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the one or more controllers 700 and/or the one or more offboard controllers and the other subsystems (e.g., of the aircraft 402). In addition, the one or more controllers 700 and/or the one or more offboard controllers may be configured to send data to external systems via a transmission medium (e.g., network connection).

Although the present disclosure is directed to the one or more controllers 700 and the one or more controllers 700 being separate, it is noted herein the one or more controllers 700 and the one or more controllers 700 may be the same and/or share select components. Therefore, the above description should not be interpreted as a limitation on the present disclosure but merely an illustration.

The one or more display devices 714 may include any display device known in the art. For example, the one or more display devices 714 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, a cathode-ray tube (CRT), or the like. Those skilled in the art should recognize that a variety of display devices 714 may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 716 may include any user input device known in the art. For example, the one or more user input devices 716 may include, but are not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the one or more display devices 714 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the input devices may include, but is not limited to, a bezel mounted interface.

Although embodiments of the present disclosure are directed to the one or more display devices 714 being indirectly coupled to the corresponding one or more user input devices 716 indirectly (e.g., via the one or more controllers 700 and/or the one or more controllers 700), it is noted herein the one or more display devices 714 may be directly coupled to the corresponding one or more user input devices 716. For example, the one or more display devices 714 may be housed with the one or more user input devices 716 in a common user interface housing. Therefore, the above description should not be interpreted as a limitation on the present disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A method for 4G Automatic Link Establishment protocol enhancement, comprising:
   receiving a first protocol data unit (PDU) including a first number of transmit level control (TLC) blocks for an Automatic Link Establishment (ALE) handshake from a calling participating unit (calling PU), the first PDU leading to a first signal-to-noise ratio (SNR) value being determined by a called participating unit (called PU);
   determining a second SNR value corresponding to the first SNR value of the first PDU based on at least a stored lookup table of the called PU, the first SNR value, and quantity of the first number of TLC blocks;
   transmitting a second PDU including a second number of TLC blocks for the ALE handshake to the calling PU following the receipt of the first PDU, the second PDU leading to a third SNR value being determined by the calling PU; and
   receiving a third PDU including a third number of TLC blocks for the ALE handshake from the calling PU following the transmission of the second PDU, the third PDU including a fourth SNR value, the third PDU leading to a fifth SNR value being determined by the called PU,
   a call linking time with the calling PU being dependent on at least one of the first number of TLC blocks in the first PDU, the second number of TLC blocks in the second PDU, or the third number of TLC blocks in the third PDU.

2. The method of claim 1, the call linking time being reduced with at least one of a low number of TLC blocks for the first number of TLC blocks in the first PDU, a low number of TLC blocks for the second number of TLC blocks in the second PDU, or a low number of TLC blocks for the third number of TLC blocks in the third PDU.

3. The method of claim 1, a data transfer rate with the calling PU being dependent on at least one of the second SNR value in an SNR field of the second PDU or the fourth SNR value in an SNR field of the third PDU.

4. The method of claim 3, the call linking time being reduced with a low number of TLC blocks for the second number of TLC blocks in the second PDU.

5. The method of claim 3, the call linking time being reduced with a low number of TLC blocks for the third number of TLC blocks in the third PDU.

6. The method of claim 1, further comprising:
   acquiring the lookup table.

7. The method of claim 6, the lookup table being pre-populated.

8. The method of claim 7, the lookup table being pre-populated with simulated data.

9. The method of claim 6, the lookup table being generated from over-the-air measurements.

10. The method of claim 1, further comprising:
    applying a scaling factor when determining the second SNR value corresponding to the first SNR value of the first PDU.

11. The method of claim 1, further comprising:
    transmitting the first PDU including the first number of TLC blocks for the ALE handshake to the called PU, the first PDU leading to the first SNR value being determined by the called PU;
    receiving the second PDU including the second number of TLC blocks for the ALE handshake from the called PU following the transmission of the first PDU, the second PDU including the second SNR value, the second PDU leading to the third SNR value being determined by the calling PU;
    determining the fourth SNR value corresponding to the third SNR value of the second PDU from a stored lookup table of the calling PU; and
    transmitting the third PDU including the third number of TLC blocks for the ALE handshake to the called PU following the receipt of the second PDU, the third PDU including the fourth SNR value, the third PDU leading to the fifth SNR value being determined by the called PU.

12. The method of claim 11, further comprising:
applying a scaling factor when determining the fourth SNR value corresponding to the third SNR value of the second PDU from the stored lookup table of the calling PU.

13. A method for 4G Automatic Link Establishment protocol enhancement, comprising:
transmitting a first protocol data unit (PDU) including a first number of transmit level control (TLC) blocks for an Automatic Link Establishment (ALE) handshake to a called participating unit (PU), the first PDU leading to a first signal-to-noise ratio (SNR) value being determined by the called PU;
receiving a second PDU including a second number of TLC blocks for the ALE handshake from the called PU following the transmission of the first PDU, the second PDU including a second SNR value, the second PDU leading to a third SNR value being determined by a calling PU;
determining a fourth SNR value corresponding to the third SNR value of the second PDU based on at least a stored lookup table of the calling PU, the third SNR, and quantity of the second number of TLC blocks; and
transmitting a third PDU including a third number of TLC blocks for the ALE handshake to the called PU following the receipt of the second PDU, the third PDU including the fourth SNR value, the third PDU leading to a fifth SNR value being determined by the called PU,
a call linking time with the calling PU being dependent on at least one of the first number of TLC blocks in the first PDU, the second number of TLC blocks in the second PDU, or the third number of TLC blocks in the third PDU.

14. The method of claim 13, further comprising:
receiving the first PDU including the first number of TLC blocks for the ALE handshake from the calling PU, the first PDU leading to the first SNR value being determined by the called PU;
determining the second SNR value corresponding to the first SNR value of the first PDU from a stored lookup table of the called PU;
transmitting the second PDU including the second number of TLC blocks for the ALE handshake to the calling PU following the receipt of the first PDU, the second PDU leading to the third SNR value being determined by the calling PU; and
receiving the third PDU including the third number of TLC blocks for the ALE handshake from the calling PU following the transmission of the second PDU, the third PDU including the fourth SNR value, the third PDU leading to the fifth SNR value being determined by the called PU.

* * * * *